United States Patent
Kubo et al.

(10) Patent No.: US 10,352,436 B2
(45) Date of Patent: Jul. 16, 2019

(54) AUTOMATIC TRANSMISSION

(71) Applicant: HONDA MOTOR CO., LTD., Tokyo (JP)

(72) Inventors: Naoyuki Kubo, Wako (JP); Takahide Watanabe, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 15/911,352

(22) Filed: Mar. 5, 2018

(65) Prior Publication Data
US 2018/0283535 A1     Oct. 4, 2018

(30) Foreign Application Priority Data

Mar. 31, 2017   (JP) .................................. 2017-072029

(51) Int. Cl.
 *F16H 61/00*    (2006.01)
 *F16H 61/02*    (2006.01)
 (Continued)

(52) U.S. Cl.
CPC ......... *F16H 61/0021* (2013.01); *F16D 41/16* (2013.01); *F16H 61/0213* (2013.01); *F16H 3/66* (2013.01); *F16H 59/42* (2013.01); *F16H 59/68* (2013.01); *F16H 61/686* (2013.01); *F16H 2003/445* (2013.01); *F16H 2059/683* (2013.01); *F16H 2200/0069* (2013.01); *F16H 2200/2012* (2013.01); *F16H 2200/2046* (2013.01); *F16H 2200/2048* (2013.01); *F16H 2200/2066* (2013.01); *F16H 2200/2082* (2013.01)

(58) Field of Classification Search
CPC .. F16H 61/0021; F16H 61/0213; F16H 59/42; F16H 2059/683; F16H 2061/0075; F16H 2061/0087
See application file for complete search history.

(56) References Cited

U.S. PATENT DOCUMENTS 5,251,512 A * 10/1993 Koenig ............... F16H 61/0213
                                                        477/120
8,930,099 B2    1/2015 Inagawa et al.
(Continued)

FOREIGN PATENT DOCUMENTS

WO    2011-068043 A1    6/2011

*Primary Examiner* — Edwin A Young
(74) *Attorney, Agent, or Firm* — Thomas | Horstemeyer, LLP (57) ABSTRACT

An automatic transmission includes hydraulic friction engaging mechanisms for establishing a plurality of gears, at least one control valve for controlling oil pressures of hydraulic oils supplied to the engaging mechanisms, an oil pressure detection unit for detecting the oil pressure of the hydraulic oil supplied by the control valve, a learning unit for learning a correction value of an instructed oil pressure to the control valve such that an engaging time becomes a target engaging time, and a determination unit which determines, based on a difference between the instructed oil pressure to the valve and an oil pressure detection result obtained by the detection unit from the hydraulic oil supplied by the valve in correspondence with the instructed oil pressure, whether to exclude a control result by the instructed oil pressure from a learning target of the learning unit.

4 Claims, 7 Drawing Sheets

(51) Int. Cl.
*F16D 41/16* (2006.01)
*F16H 59/68* (2006.01)
*F16H 59/42* (2006.01)
*F16H 3/44* (2006.01)
*F16H 3/66* (2006.01)
*F16H 61/686* (2006.01)

(56) References Cited

U.S. PATENT DOCUMENTS

2013/0080008 A1* 3/2013 Tanaka .................... F16H 61/12
　　　　　　　　　　　　　　　　　　　　701/62
2013/0158761 A1* 6/2013 Kawakami .............. F16D 48/02
　　　　　　　　　　　　　　　　　　　　701/22

\* cited by examiner

|       | C1 | C2 | C3 | B1 | B2 | B3 | F1  | GEAR RATIO |
|-------|----|----|----|----|----|----|-----|------------|
| RVS   |    |    | O  |    | O  |    | O   | 4.008      |
| 1st   |    |    |    | O  | O  | (O)| △/O | 5.233      |
| 2nd   |    | O  |    | O  | O  |    | (△) | 3.367      |
| 3rd   |    |    | O  | O  | O  |    | (△) | 2.298      |
| 4th   |    | O  | O  | O  |    |    | (△) | 1.705      |
| 5th   | O  |    | O  | O  |    |    | (△) | 1.363      |
| 6th   | O  | O  | O  |    |    |    | (△) | 1.000      |
| 7th   | O  |    | O  |    | O  |    | (△) | 0.786      |
| 8th   | O  | O  |    |    | O  |    | (△) | 0.657      |
| 9th   | O  |    |    |    | O  | O  | (△) | 0.584      |
| 10th  | O  | O  |    |    |    | O  | (△) | 0.520      |
| P/N   |    |    |    |    |    |    | △/O | —          |

FIG. 2B

| PLANETARY GEAR MECHANISM | GEAR RATIO |
|--------------------------|------------|
| P1                       | 2.681      |
| P2                       | 1.914      |
| P3                       | 1.614      |
| P4                       | 2.734      |

AUTOMATIC TRANSMISSION

BACKGROUND OF THE INVENTION

Field of the Invention

The present invention relates to an automatic transmission.

Description of the Related Art

An automatic transmission switches a gear range by connecting and disconnecting the rotating bodies of a planetary gear mechanism by a hydraulic friction engaging mechanism such as a hydraulic clutch. In some cases, the control result varies because of the individual difference of the hydraulic friction engaging mechanism or a control valve. International Patent Publication No. 2011/068043 Pamphlet proposes a technique of eliminating the influence of the individual difference of a hydraulic friction engaging mechanism or the like by a learning function of control.

In some cases, a control result is influenced by a factor other than an assumed factor of a variation. If this control result is used as the subject of learning, a learning error occurs, and the learning accuracy lowers.

SUMMARY OF THE INVENTION

It is an object of the present invention to reduce learning errors.

According to an aspect of the present invention, there is provided an automatic transmission comprising: a plurality of hydraulic friction engaging mechanisms configured to switch a transmission path of a driving force and establish a plurality of gears; at least one control valve configured to control oil pressures of hydraulic oils supplied to the plurality of hydraulic friction engaging mechanisms; an oil pressure detection unit configured to detect the oil pressure of the hydraulic oil supplied by the control valve; a learning unit configured to learn a correction value of an instructed oil pressure to the control valve such that an engaging time becomes a target engaging time; and a determination unit configured to determine, based on a difference between the instructed oil pressure to the control valve and an oil pressure detection result obtained by the oil pressure detection unit from the hydraulic oil supplied by the control valve in correspondence with the instructed oil pressure, whether to exclude a control result by the instructed oil pressure from a learning target of the learning unit.

Further features of the present invention will become apparent from the following description of exemplary embodiments (with reference to the attached drawings).

DESCRIPTION OF THE EMBODIMENTS

Figure 1:
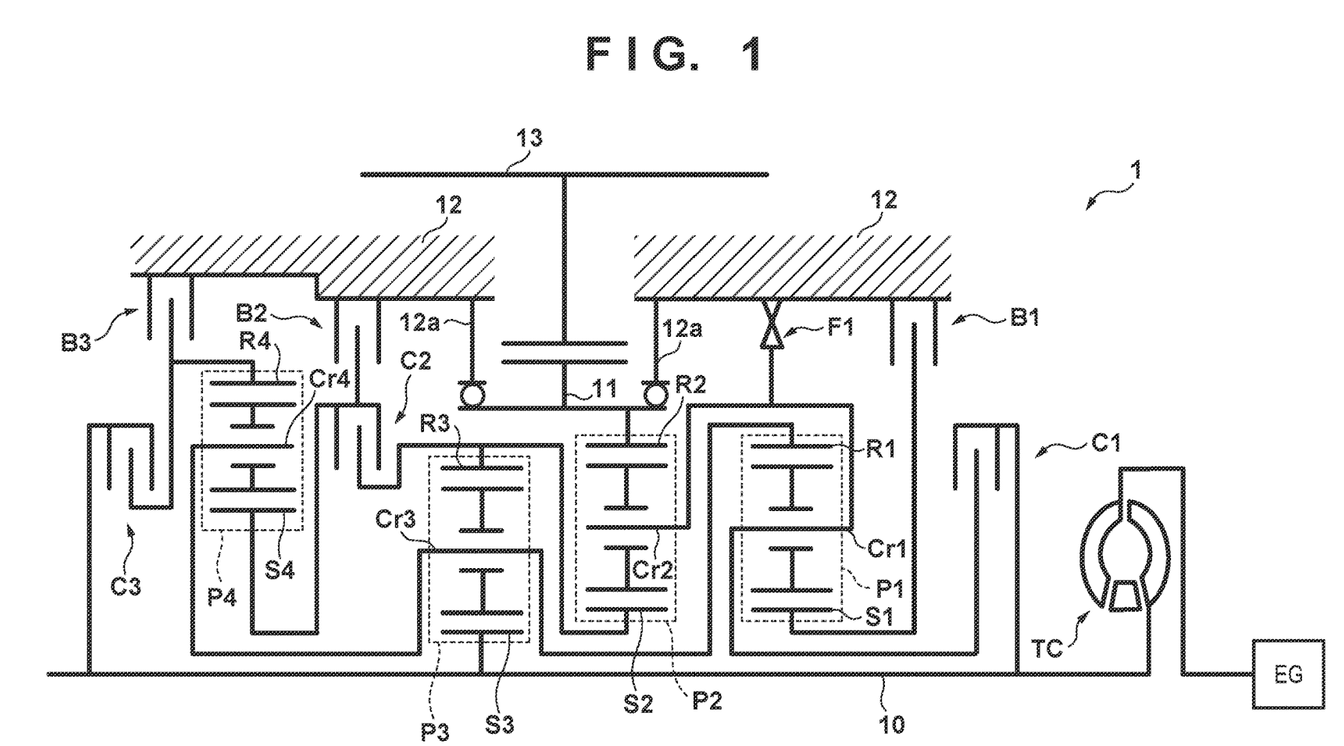
FIG. 1 is a skeleton diagram of an automatic transmission according to an embodiment of the present invention.

FIG. 1 is a skeleton diagram of an automatic transmission 1 according to an embodiment of the present invention. Referring to FIG. 1, the automatic transmission 1 includes a main shaft (input shaft) 10 rotatably axially supported in a casing 12 that forms a transmission case, an output member 11 rotatably supported by support members 12a supported in the casing 12 so as to be coaxial with respect to the main shaft 10, and a counter shaft (output shaft) 13.

A driving force from an engine EG (to be sometimes simply referred to as EG) that is an internal combustion engine is input to the main shaft 10, and the main shaft 10 is rotated by the driving force. A starting device is provided between the main shaft 10 and the engine EG. Examples of the starting device are a clutch type starting device (single disc clutch, multiple disc clutch, or the like) and a hydraulic coupling type starting device (torque converter or the like). In this embodiment, a torque converter TC is provided. Hence, the driving force of the engine EG is input to the main shaft 10 through the torque converter TC.

The output member 11 includes a gear concentric to the main shaft 10. The counter shaft 13 includes a gear that meshes with the gear. The rotation of the main shaft 10 changes its speed through transmission mechanisms to be described below and is then transmitted to the counter shaft 13. The rotation (driving force) of the counter shaft 13 is transmitted to driving wheels through, for example, differential gears and final reduction gears (not shown).

As the transmission mechanisms, the automatic transmission 1 includes planetary gear mechanisms P1 to P4 and engaging mechanisms C1 to C3, B1 to B3, and F1. In this embodiment, all the planetary gear mechanisms P1 to P4 are single pinion type planetary gear mechanisms. The planetary gear mechanisms P1 to P4 transmit the driving force from the main shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the main shaft 10.

When ordered in accordance with the arrangement order at intervals corresponding to gear ratios shown in the velocity diagram of FIG. 3 (to be described later), the sun gear S1, the carrier Cr1, and the ring gear R1 of the planetary gear mechanism P1 can be referred to as a first rotational element, a second rotational element, and a third rotational element in this order.

Similarly, the ring gear R2, the carrier Cr2, and the sun gear S2 of the planetary gear mechanism P2 can be referred to as a fourth rotational element, a fifth rotational element, and a sixth rotational element in this order.

Similarly, the sun gear S3, the carrier Cr3, and the ring gear R3 of the planetary gear mechanism P3 can be referred to as a seventh rotational element, an eighth rotational element, and a ninth rotational element in this order.

Similarly, the ring gear R4, the carrier Cr4, and the sun gear S4 of the planetary gear mechanism P4 can be referred to as a 10th rotational element, a 11th rotational element, and a 12th rotational element in this order.

Each of the engaging mechanisms C1 to C3, B1 to B3, and F1 functions as a clutch or a brake. A clutch connects/disconnects the rotational elements provided in the automatic transmission 1. A brake connects/disconnects the rotational elements provided in the automatic transmission 1 to/from the casing 12. The rotational elements provided in the automatic transmission 1 include the main shaft 10 and the sun gears, ring gears, and carriers of the planetary gear mechanisms P1 to P4.

In this embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaging state (fastening state) and a release state, and the state of the engaging mechanism F1 is switched, the driving force transmission path from the main shaft 10 to the output member 11 is switched, and the plurality of gear ranges are implemented.

In this embodiment, all the engaging mechanisms C1 to C3 and B1 to B3 are assumed to be hydraulic friction engaging mechanisms. Examples of the hydraulic friction engaging mechanism are dry and wet single disc clutches and dry and wet multiple disc clutches.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC) in which the rotation of the predetermined rotational elements (carriers Cr1 and Cr2) is restricted only in one direction, and rotation in the reverse direction is permitted and a rotation inhibition state (to be sometimes referred to as TWC) in which rotation is restricted in both directions.

In the one-way rotation permission state, the same function as a so-called one-way clutch is implemented. In this state, the rotational elements transmit the driving force in one rotation direction but slip in the reverse direction. In this embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In this embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

An example of the structure of the engaging mechanism F1 will be described later. For example, a known two-way clutch can be employed. Some known two-way clutches can be switched between the one-way rotation permission state, the rotation inhibition state, and a two-way rotation permission state by driving control of a corresponding hydraulic actuator or electromagnetic actuator. Some known two-way clutches can further switch the one-way rotation permission state between a forward rotation permission state and a reverse rotation permission state. In this embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 1.

The sun gear S3 of the planetary gear mechanism P3 is connected to the main shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 is a planetary gear mechanism that performs driving transmission to the counter shaft 13.

The clutch C1 connects the main shaft 10 to the carrier Cr1 of the planetary gear mechanism P1 and the carrier Cr2 connected to the carrier Cr1 in the engaging state, and disconnects them in the release state. Note that the release state will sometimes be referred to as a disengaging state. The clutch C2 connects the ring gear R3 of the planetary gear mechanism P3 to the sun gear S4 of the planetary gear mechanism P4 in the engaging state, and disconnects them in the release state. The clutch C3 connects the main shaft 10 to the ring gear R4 of the planetary gear mechanism P4 in the engaging state, and disconnects them in the release state.

The brake B1 connects the casing 12 to the sun gear S1 of the planetary gear mechanism P1 in the engaging state, and disconnects them in the release state. The brake B2 connects the casing 12 to the sun gear S4 of the planetary gear mechanism P4 in the engaging state, and disconnects them in the release state. The brake B3 connects the casing 12 to the ring gear R4 of the planetary gear mechanism P4 in the engaging state, and disconnects them in the release state.

As already described, the brake F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

Figure 2A:
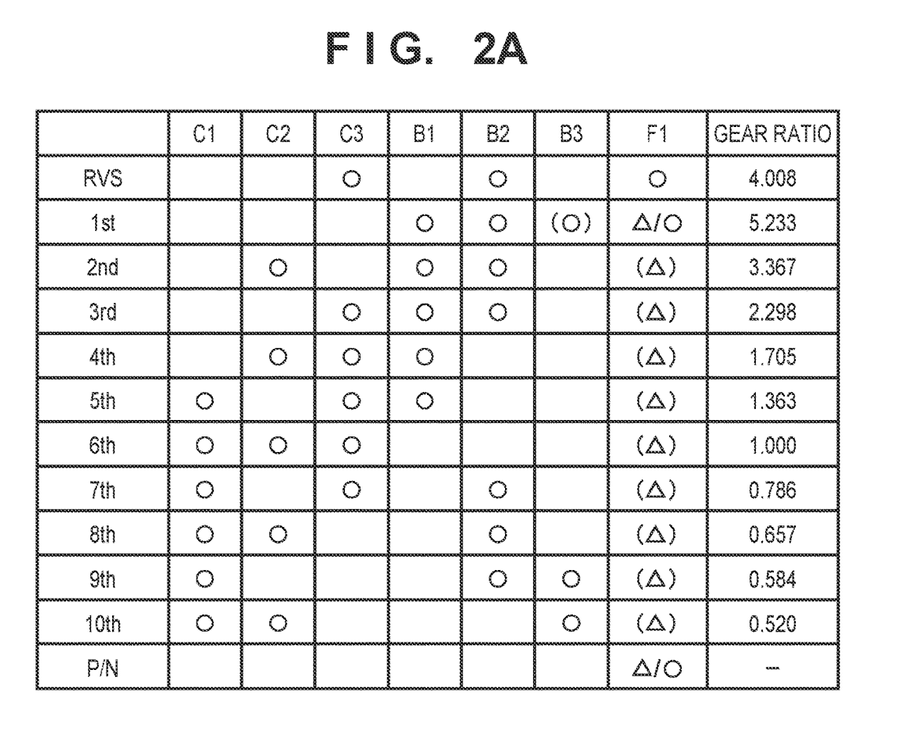
FIG. 2A is a view showing an example of the engagement table of engaging mechanisms.
Figure 2B:
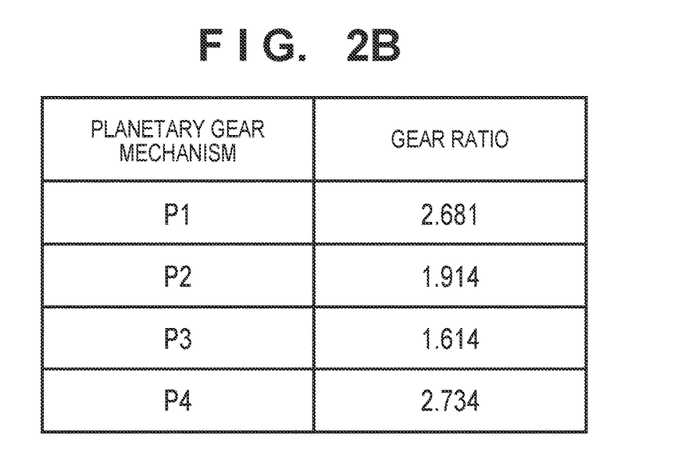
FIG. 2B is a view showing the gear ratios of planetary gear mechanisms.

FIG. 2A is an engagement table (fastening table) showing the engaging combination of the engaging mechanisms provided in the automatic transmission 1. FIG. 2B shows the gear ratios of the planetary gear mechanisms provided in the automatic transmission 1. FIG. 3 is a velocity diagram of the automatic transmission 1. "Gear ratio" in FIG. 2A indicates the gear ratio between the main shaft 10 and the output member 11.

In this embodiment, a running range that transmits the driving force to the wheel side and a non-running range that does not transmit the driving force are included in selectable shift ranges. In the running range, 10 forward ranges or gears (1st to 10th) and one reverse range or gear (RVS) can be established. "P/N" represents non-running ranges; "P", a parking range; and "N", a neutral range.

In the example of the engagement table shown in FIG. 2A, "◯" indicates the engaging state, and no mark indicates the release state. Note that there are included engaging mechanisms that are set in the engaging state for smooth change to adjacent gear ranges, although the engagement is not essential to establish the gear ranges. For example, in the 1st gear (1st), engagement of the brake B2 is not essential. However, when changing to the reverse range (RVS) or 2nd gear (2nd), the brake B2 is set in the engaging state for the purpose of decreasing the engaging mechanisms to switch the engaging state. Similarly, in the 5th gear (5th), engagement of the clutch C3 is not essential. However, when changing to the 4th gear (4th) or 6th gear (6th), the clutch C3 is set in the engaging state for the purpose of decreasing the engaging mechanisms to switch the engaging state.

In the arrangement according to this embodiment, when sequentially changing the gear between the 1st gear and the 10th gear, one of the hydraulic friction engaging mechanisms C1 to C3 and B1 to B3 is set in the release state, and one is set in the engaging state, thereby establishing each gear range. In the gear change, the fact that the number of engaging mechanisms to be set in the engaging state is one is advantageous in shortening the gear change time or simplifying control.

As for the brake F1, "○" indicates the rotation inhibition state, and "Δ" indicates the one-way rotation permission state. In the 1st gear (1st), the brake F1 can be set in either the rotation inhibition state or the one-way rotation permission state. In the rotation inhibition state, the engine brake is enabled. In the 1st gear, the brake F1 is set in the one-way rotation permission state. The engine brake is switched between the enabled state and a disabled state by engaging or releasing the brake B3. In FIG. 2A, "○" of the brake B3 in the 1st gear (1st) indicates this.

An algorithm to determine which state is set for the brake F1 in the 1st gear (1st) can appropriately be designed. In this embodiment, the state before a change to the 1st gear (1st) is inherited. For example, when changed from the reverse range (RVS) to the 1st gear (1st), the brake F1 remains in the rotation inhibition state in the 1st gear (1st). However, if, for example, the vehicle speed exceeds a predetermined speed, the brake F1 is switched to the one-way rotation permission state. Similarly, when changed from other forward ranges (2nd to 10th) to the 1st gear (1st), the brake F1 remains in the one-way rotation permission state in the 1st gear (1st).

In the non-running ranges (P/N) as well, the state of the brake F1 can be either the rotation inhibition state or the one-way rotation permission state. In this embodiment, the state before a change to the non-running ranges (P/N) is inherited, as in the 1st gear (1st).

In the 2nd gear (2nd) to the 10th gear (10th), the brake F1 is set in the one-way rotation permission state, but slips because of the structure of the automatic transmission 1. For this reason, the state of the brake F1 is indicated by "(Δ)". If the brake F1 is a mechanical engaging mechanism capable of selecting the above-described two-way rotation permission state, the brake F1 can also be set in the two-way rotation permission state in the 2nd gear (2nd) to the 10th gear (10th).

Note that in this embodiment, the one-way rotation permission state is selected as the state of the brake F1 in each of the 2nd gear (2nd) to the 10th gear (10th), and these ranges cannot be established in the rotation inhibition state. However, an arrangement that selects the rotation inhibition state can also be employed depending on the arrangement of the automatic transmission 1.

Figure 3:
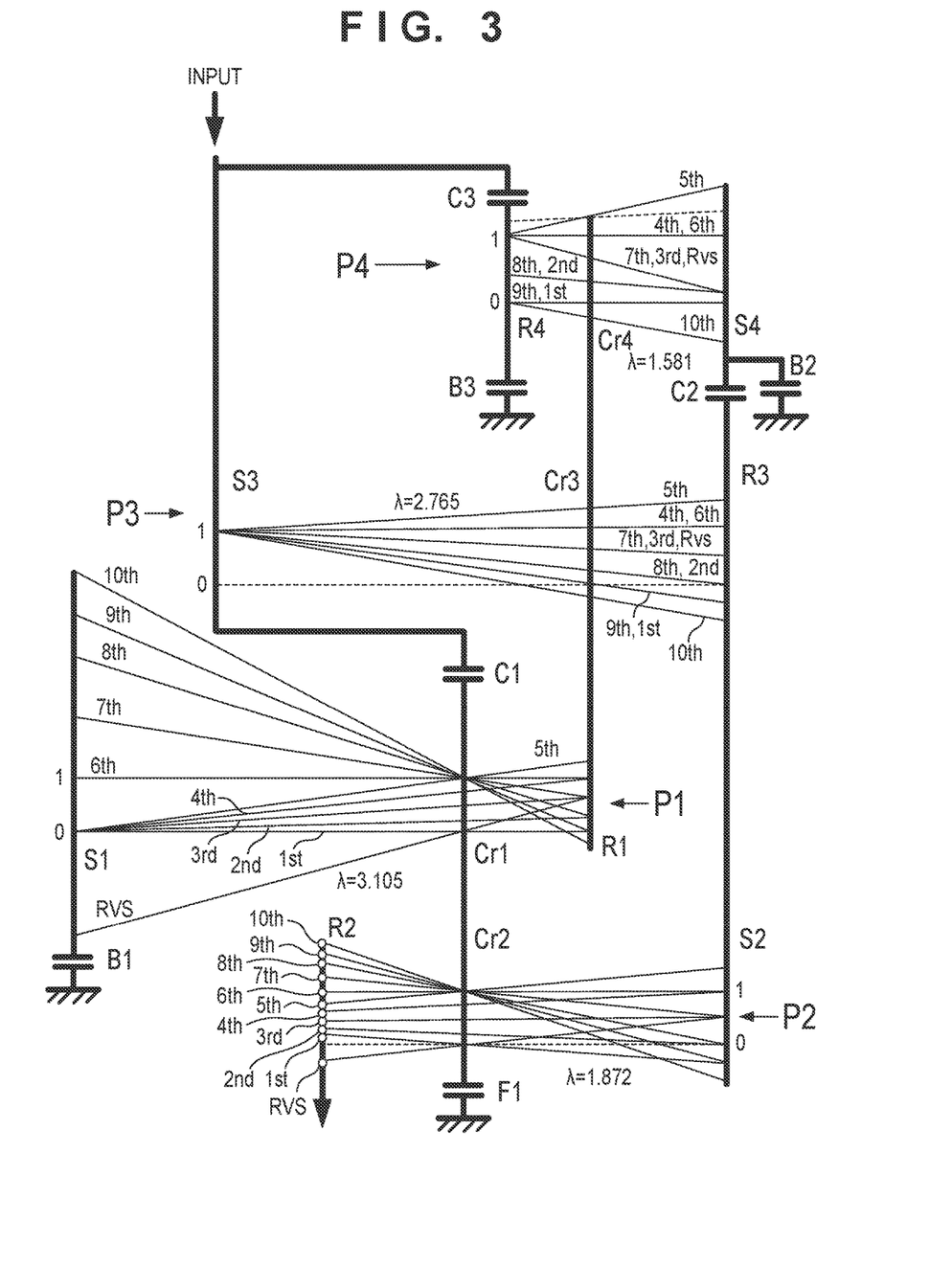
FIG. 3 is a velocity diagram of the automatic transmission shown in FIG. 1.

The velocity diagram of FIG. 3 shows the rotation speed ratio of each element to the input to the main shaft 10 in each gear range. The ordinate represents the speed ratio. "1" indicates the same rotation speed as the main shaft 10, and "0" indicates a stop state. The abscissa is based on the gear ratio between the rotational elements of the planetary gear mechanisms P1 to P4. λ is the gear ratio between a carrier Cr and a sun gear S. Note that in FIG. 3, elements corresponding to the counter shaft 13 are not illustrated.

<Control System>

Figure 4A:
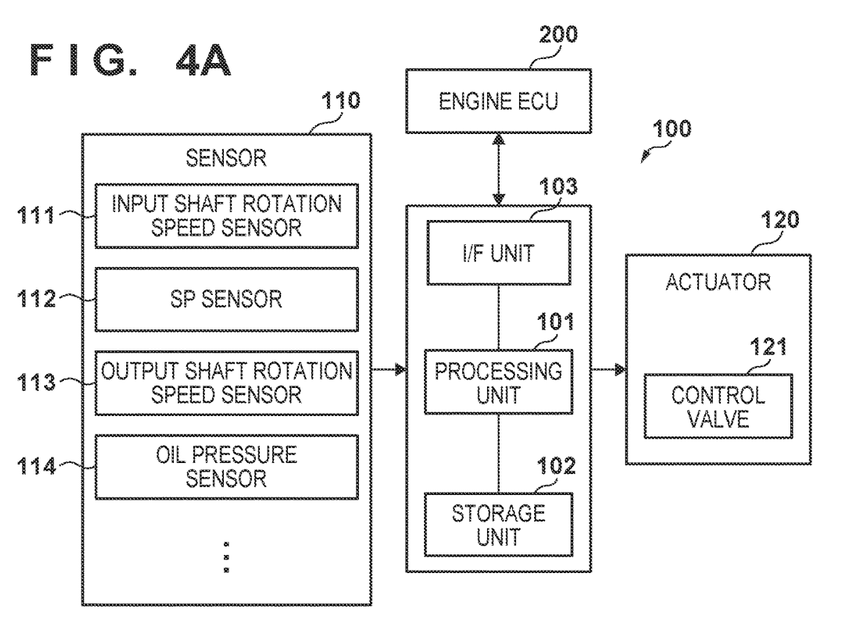
FIG. 4A is a block diagram of a control system.

FIG. 4A is a block diagram of the control apparatus of the automatic transmission 1. The control apparatus includes an ECU 100 that is communicably connected to an engine ECU 200 for controlling the engine EG, and controls the automatic transmission 1 including the torque converter TC.

The ECU 100 includes a processing unit 101 such as a CPU, a storage unit 102 such as a RAM and ROM, and an I/F unit 103 that interfaces between the processing unit 101 and an external device or the engine ECU 200. The I/F unit 103 is formed from, for example, a communication interface or an input/output interface.

The processing unit 101 executes a program stored in the storage unit 102 and controls various kinds of actuators 120 based on the detection results of various kinds of sensors 110.

The various kinds of sensors 110 include various kinds of sensors provided in the automatic transmission 1. FIG. 4A illustrates the following sensors. An input shaft rotation speed sensor 111 is a sensor that detects the rotation speed of the main shaft 10. The rotation speed of the main shaft 10 will sometimes be referred to as NM.

An SP sensor (shift position sensor) 112 is a sensor that detects a shift position selected by the driver. In this embodiment, four types of shift positions, that is, P range (parking range), D range (forward range), N range (neutral range), and R range (reverse range) are assumed as the shift positions. If the D range is selected, the processing unit 101 selects one of the 1st gear (1st) to the 10th gear (10th) in accordance with a gear change map stored in the storage unit 102 and changes the gear. If the R range is selected, the processing unit 101 selects the reverse range.

An output shaft rotation speed sensor 113 is a sensor that detects the rotation speed of the counter shaft 13. The rotation speed of the counter shaft 13 will sometimes be referred to as NC.

An oil pressure sensor 114 detects the oil pressures of hydraulic oils supplied to the engaging mechanisms C1 to C3 and B1 to B3. In this embodiment, six oil pressure sensors 114 are provided in correspondence with the engaging mechanisms C1 to C3 and B1 to B3. However, for example, an arrangement that causes the plurality of engaging mechanisms to share one oil pressure sensor 114 by switching the channel between a detection target engaging mechanism and the oil pressure sensor can also be employed.

The various kinds of actuators 120 include various kinds of actuators provided in the automatic transmission 1. For example, a control valve 121 that controls the oil pressures of the hydraulic oils supplied to the engaging mechanisms C1 to C3 and B1 to B3 and an electromagnetic actuator such as an electromagnetic solenoid that switches the operation state of the engaging mechanism F1 are included. The control valve 121 is, for example, a linear solenoid valve, and controls the oil pressures of the hydraulic oils supplied to the engaging mechanisms C1 to C3 and B1 to B3. In this embodiment, six control valves 121 are provided in correspondence with the engaging mechanisms C1 to C3 and B1 to B3. However, for example, an arrangement that causes the plurality of engaging mechanisms to share one control valve 121 by switching the channel between a supply target engaging mechanism and the control valve can also be employed. In an arrangement including a small number of gear ranges and a small number of engaging mechanisms, the control of the oil pressures of the hydraulic oils of the engaging mechanisms can be done by the one control valve 121.

Figure 4B:
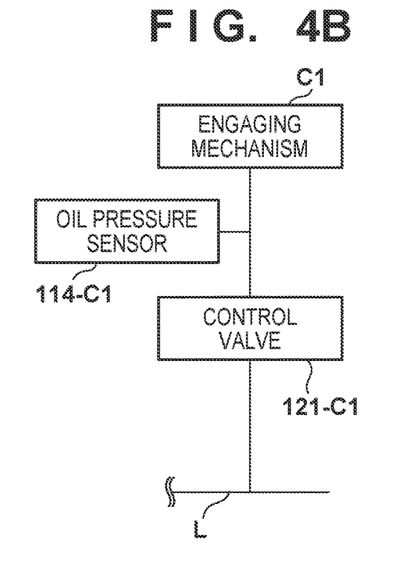
FIG. 4B is an explanatory view of a hydraulic circuit.

FIG. 4B shows an example of a hydraulic circuit associated with the engaging mechanism C1, and shows an example of the arrangement of an oil pressure sensor 114-C1 and a control valve 121-C1 corresponding to the engaging mechanism C1. The flow rate of the hydraulic oil supplied to the engaging mechanism C1 is controlled by the control valve 121-C1 provided on a supply line L of the hydraulic oil, thereby controlling the oil pressure. In addition, the oil pressure sensor 114-C1 is arranged in the channel between the control valve 121-C1 and the engaging mechanism C1, thereby detecting the oil pressure of the hydraulic oil supplied to the engaging mechanism C1. FIG. 4B shows an example of the hydraulic circuit associated with the engaging mechanism C1. However, the hydraulic circuits of the engaging mechanisms C2, C3, and B1 to B3 also have the same arrangement as described above.

Figure 4C:
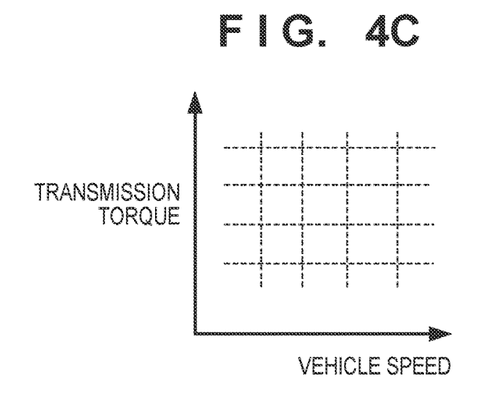
FIG. 4C is a view showing an example of a map of learning values (correction values)

An example of information stored in the storage unit 102 will be described next. FIG. 4C shows an example of a map of learning values stored in the storage unit 102. In this embodiment, the learning value is the correction value of an instructed oil pressure (controlled variable) for the control valve 121 at the time of a gear change to upshift, and is, for example, a gain value for the controlled variable before correction. The correction value may be a value to be added to or subtracted from the controlled variable before correction in addition to the gain value.

The engaging mechanism C1 to C3 and B1 to B3 can have individual differences or wear caused by aging. For example, the capacity of hydraulic oil, the sliding resistance of a piston, and the like can have individual differences. The learning value according to this embodiment aims at eliminating the influence of such an individual difference such that the engaging time from the start of engagement to the completion of engagement becomes a target engaging time.

The map of learning values is provided for each of the engaging mechanism C1 to C3 and B1 to B3 and prepared for each gear range. When loading a correction value, the map of the gear change destination is selected. For example, when a gear change from the 1st gear to the 2nd gear is performed, a map corresponding to the 2nd gear is selected.

In the map shown in FIG. 4C, a correction value is defined by the relationship between a transmission torque and a vehicle speed, and the correction value is set at each lattice point defined by the transmission torque and the vehicle speed. The transmission torque is a torque transmitted in the engaging state of the engaging mechanism, and can be calculated from, for example, the rotation speed and load of the engine EG and the slip ratio of the torque converter TC. The rotation speed and load of the engine EG can be specified based on information from the engine ECU 200. The slip ratio of the torque converter TC can be calculated from the rotation speed of the engine EG and the rotation speed NM of the main shaft 10. The vehicle speed may be obtained from a vehicle speed sensor (not shown) or may be calculated from the rotation speed NC of the counter shaft 13.

Figure 5A:
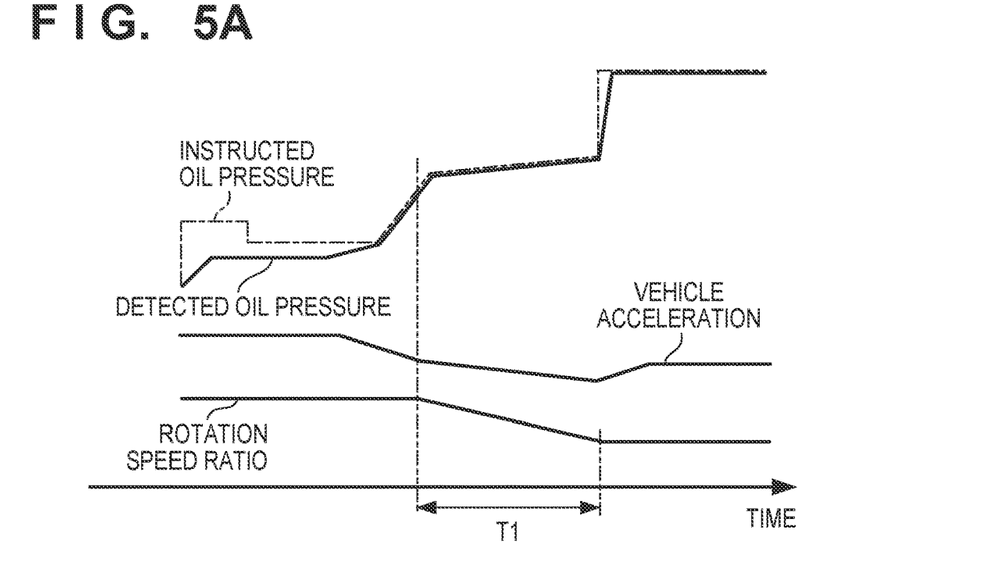
FIGS. 5A and 5B are timing charts showing examples of control results before and after learning.
Figure 5B:
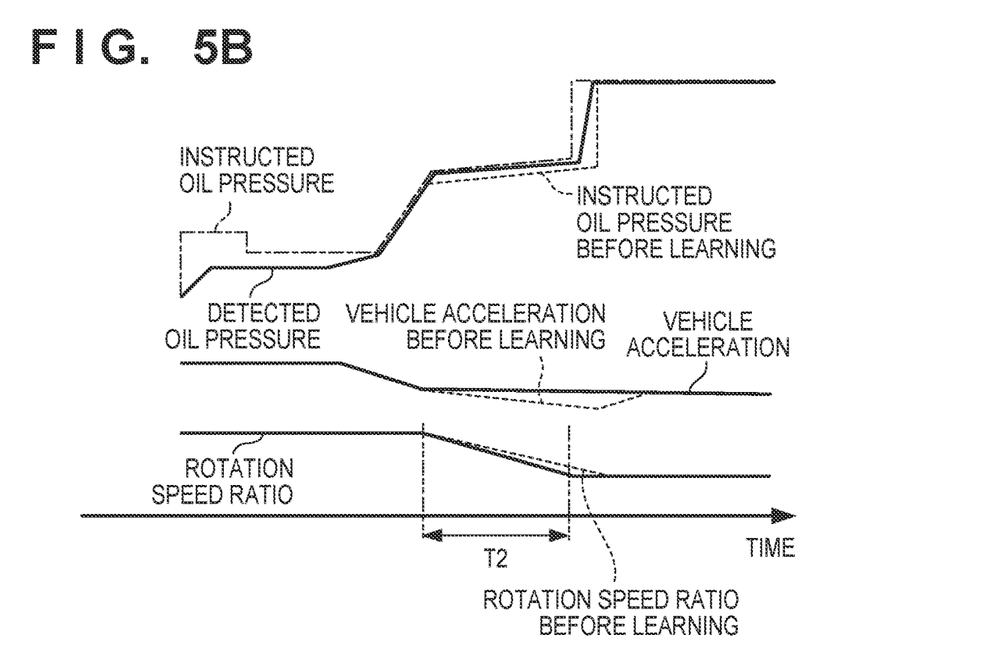

FIGS. 5A and 5B are timing charts schematically showing examples of changes in the instructed oil pressure, detected oil pressure, vehicle acceleration, and rotation speed ratio before learning (FIG. 5A) and after learning (FIG. 5B). The examples of FIGS. 5A and 5B show behaviors before and after learning in a case of shift-up.

The instructed oil pressure represents an oil pressure corresponding to a controlled variable for the control valve 121, and the detected oil pressure represents an oil pressure generated when the control valve 121 drives based on the instructed oil pressure. For example, when making a shift-up from the 4th gear to the 5th gear (see FIG. 2A), such an instructed oil pressure is output from the ECU 100 to the control valve 121-C1 corresponding to the engaging mechanism C1, and the oil pressure sensor 114 detects the oil pressure of the supplied hydraulic oil.

The vehicle acceleration schematically represents a change in the acceleration of the vehicle at the time of a gear change. The rotation speed ratio is the ratio (NM/NC) of the rotation speed of the main shaft 10 to the rotation speed of the counter shaft 13. During steady rotation in which a gear range is established, when the main shaft 10 rotates, the counter shaft 13 also follows and rotates. Hence, the rotation speed ratio is constant. During switching of the gear range, even when the main shaft 10 rotates, the counter shaft 13 does not follow or rotate (driving transmission is interrupted). Hence, the rotation speed ratio changes. It can be considered that when the rotation speed ratio starts changing, the engagement of the engaging mechanism is started, and when the change in the rotation speed ratio ends, the engagement of the engaging mechanism is completed. For this reason, the time from the start of the change in the rotation speed ratio to the end of the change can be regarded as the engaging time from the start to completion of the engagement of the engaging mechanism.

As already described, the purpose of learning according to this embodiment is to eliminate the influence of the individual differences of the engaging mechanism C1 to C3 and B1 to B3 and the like and maintain the engaging time in a target engaging time. If the engaging time is long, the gear change may be delayed. In addition, if the engaging time is short, a gear change shock (vehicle acceleration) may become large. When the engaging time is maintained in the target engaging time, ride comfort assumed for the vehicle can be maintained. The target engaging time can be set for each of the engaging mechanism C1 to C3 and B1 to B3.

In the example of FIG. 5A, after the gear change is decided, the instructed oil pressure starts being output. Although the hydraulic oil is supplied to the engaging mechanism, a predetermined time is needed until it is filled up to the capacity. For this reason, the detected oil pressure rises from certain timing. When the engaging mechanism starts engaging, the rotation speed ratio starts changing (lowering). When the engagement is completed (in a state in which the necessary torque is transmitted), the change in the rotation speed ratio stops. A time T1 in which the rotation speed ratio changes can be considered as the engaging time. As for the determination of the start and end of the change in the rotation speed ratio, the determination can be done by setting a threshold and determining whether the rotation speed ratio falls below or exceeds the threshold.

Here, assume a case in which the time T1 is longer than the target engaging time. By learning of the control result, the learning value (correction value) is set to shorten the time T1. For example, if the correction value is a gain value for the controlled variable before correction, the correction value is set in a direction to increase the gain.

FIG. 5B schematically shows a behavior after learning in the same state as in FIG. 5A. The instructed oil pressure after learning has a portion higher than the instructed oil pressure before learning, and the detected oil pressure has a portion that rises more quickly than before learning. An engaging time T2 is improved to be shorter than the engaging time T1. In the example of FIG. 5B, the variation in the vehicle acceleration is also suppressed as compared to that before learning. When such learning is repetitively performed, the engaging time can be maintained in the target engaging time.

An example of an element that becomes the factor of a learning error will be described next. The following property of the control valve 121 to the instructed oil pressure is relatively precisely adjusted at the manufacturing stage. However, the following property may lower due to an aging degradation associated with the use. If the above-described learning is performed in a case in which the following property of the control valve 121 has lowered, the engaging time rather deviates from the target engaging time in some cases.

Figure 6A:
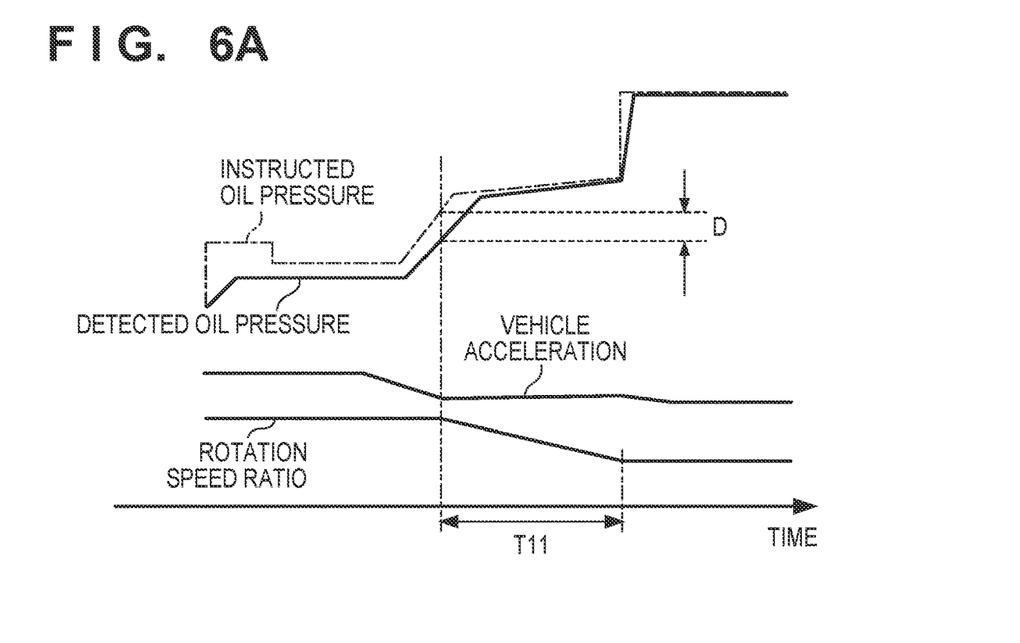
FIGS. 6A and 6B are timing charts showing examples of control results before and after learning.
Figure 6B:
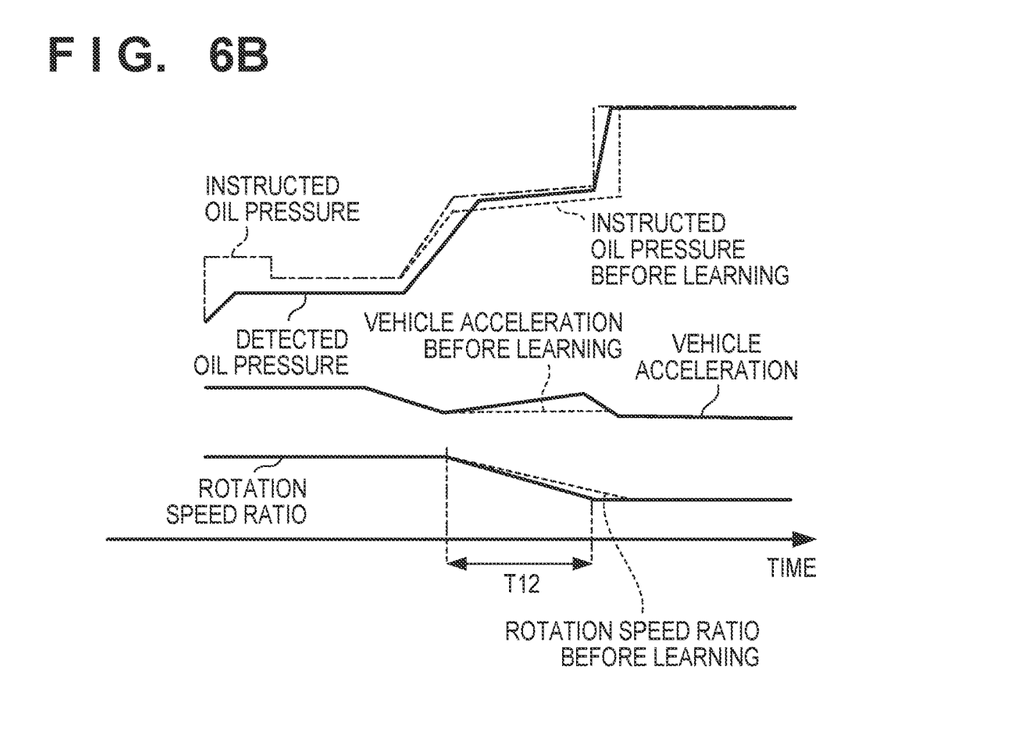

FIGS. 6A and 6B are timing charts schematically showing examples of changes in the instructed oil pressure, detected oil pressure, vehicle acceleration, and rotation speed ratio before learning (FIG. 6A) and after learning (FIG. 6B) in a case in which the following property of the control valve 121 to the instructed oil pressure has lowered.

Referring to FIG. 6A, at the timing at which the rotation speed ratio changes (lowers), a difference D is generated the instructed oil pressure and the detected oil pressure. Assume that a time T11 is longer than the target engaging time, and learning is performed in a direction to increase the instructed oil pressure.

Figure 7:
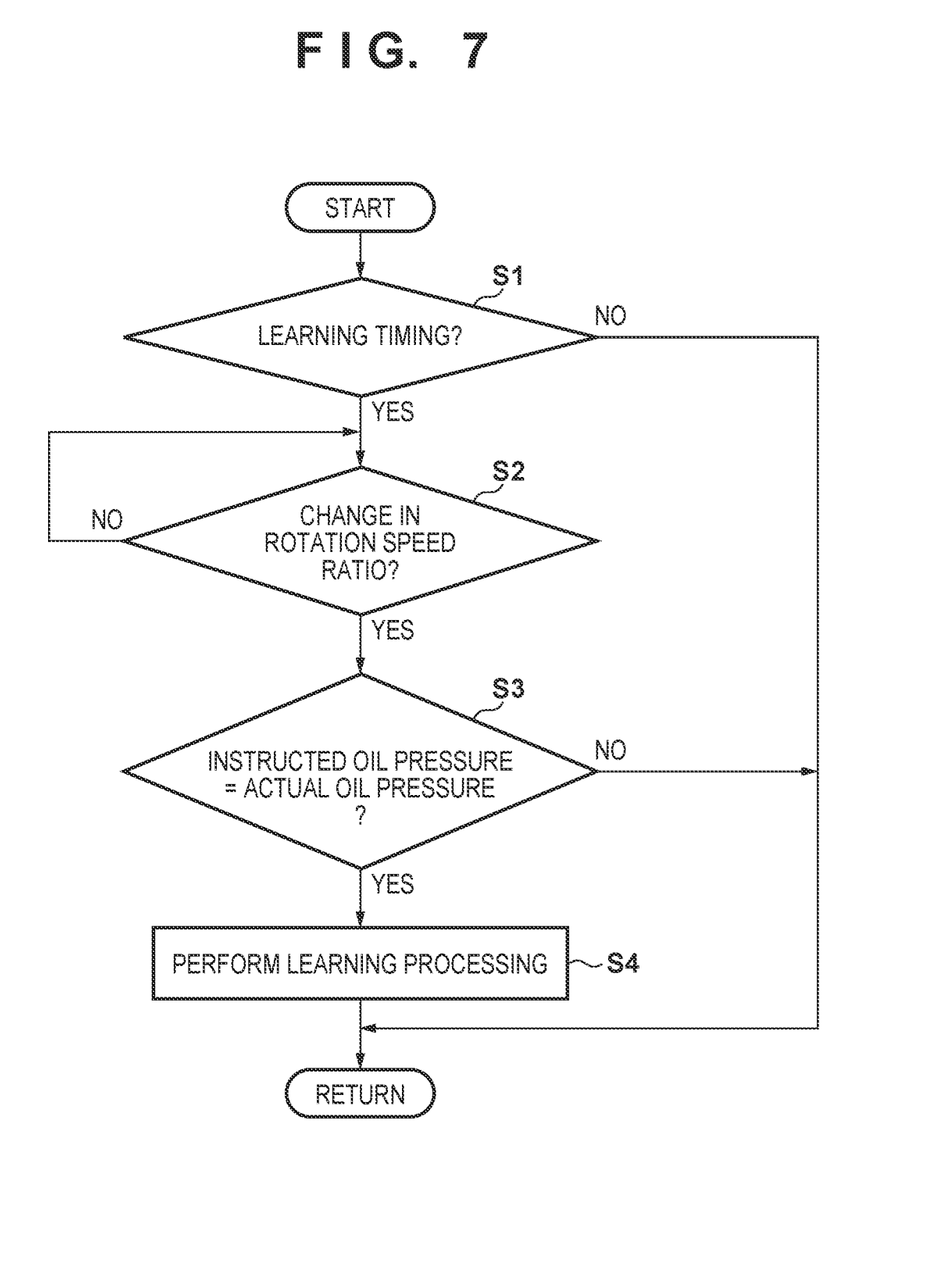
FIG. 7 is a flowchart showing an example of processing of an ECU.

FIG. 6B schematically shows a behavior after learning in the same state as in FIG. 6A. The instructed oil pressure after learning has a portion higher than the instructed oil pressure before learning, and the detected oil pressure has a portion higher than before learning. Although an engaging time T12 is made shorter than the engaging time T11, the variation in the vehicle acceleration is larger than before learning, and the gear change shock becomes worse. Such learning errors are preferably reduced. FIG. 7 is a flowchart showing an example of processing for avoiding the learning error described with reference to FIGS. 6A and 6B, which shows an example of processing associated with learning executed by the ECU 100 at the time of a gear change.

In step S1, it is determined whether it is the learning timing. In some cases, the learning result is not appropriately reflected on the control depending on the traveling state of the vehicle. In step S1, it is determined whether the traveling state is suitable for learning. As the possible conditions of the learning timing, for example, it is the time of a gear change to upshift, an operation for the accelerator pedal is not performed, and the vehicle speed falls within a predetermined vehicle speed range. Upon determining that it is the learning timing, the process advances to step S2. Otherwise, the processing ends.

In step S2, the detection results of the input shaft rotation speed sensor 111 and the output shaft rotation speed sensor 113 are acquired, the rotation speed ratio is calculated, and it is determined whether the rotation speed ratio changes. In FIG. 5A, it is determined whether it is the start timing of the time T1. Upon determining that the rotation speed ratio changes, counting of the engaging time is stared, and the process advances to step S3.

In step S3, the detection result of the oil pressure sensor 114 corresponding to the engaging mechanism of the control target is acquired, and it is determined whether the instructed oil pressure and the detected oil pressure are equal. For example, if the difference between the instructed oil pressure and the detected oil pressure is equal to or smaller than a threshold, it is determined that the instructed oil pressure and the detected oil pressure are equal. In FIG. 6A, it is determined whether the magnitude of the difference D is equal to or larger than the threshold. Upon determining that the instructed oil pressure and the detected oil pressure are equal, the process advances to step S4. Upon determining that the instructed oil pressure and the detected oil pressure are not equal, the processing ends. Counting of the engaging time is also ended.

In step S4, learning processing is performed. Here, for example, it is determined whether the rotation speed ratio changes. In FIG. 5A, it is determined whether it is the end timing of the time T1. If it is the end timing, the engaging time is determined. If the determined engaging time is not maintained in the target engaging time, the correction value is corrected. The map of learning values corresponding to the transmission torque, vehicle speed, and the like in the current gear change is read out, and the corresponding correction value is updated. The processing thus ends.

In this embodiment, if it is determined in step S3 that the instructed oil pressure and the detected oil pressure are not equal, the learning processing in step S4 is not performed, and the control result by the instructed oil pressure in the current gear change control is excluded from the learning target. It is therefore possible to reduce execution of a learning error as described with reference to FIGS. 6A and 6B.

<Summary of Embodiment>

1. An automatic transmission (for example, 1) according to the above embodiment comprises:

a plurality of hydraulic friction engaging mechanisms (for example, C1-C3, B1-B3) configured to switch a transmission path of a driving force and establish a plurality of gear ranges;

at least one control valve (for example, 121) configured to control oil pressures of hydraulic oils supplied to the plurality of hydraulic friction engaging mechanisms;

an oil pressure detection unit (for example, 114) configured to detect the oil pressure of the hydraulic oil supplied by the control valve;

a learning unit (for example, 100, S4) configured to learn a correction value of an instructed oil pressure to the control valve such that an engaging time becomes a target engaging time; and a determination unit (for example, 100, S3) configured to determine, based on a difference between the instructed oil pressure to the control valve and an oil pressure detection result obtained by the oil pressure detection unit from the hydraulic oil supplied by the control valve in correspondence with the instructed oil pressure, whether to exclude a control result by the instructed oil pressure from a learning target of the learning unit.

According to this embodiment, when the following property of the detected oil pressure to the instructed oil pressure lowers, the control result can be excluded from the learning target, and learning errors can be reduced.

2. The automatic transmission (for example, 1) according to the above embodiment further comprises:

a first detection unit (for example, 111) configured to detect a rotation speed of a main shaft (for example, 10); and a second detection unit (for example, 113) configured to detect a rotation speed of a counter shaft (for example, 13), and the determination unit performs the determination based on the instructed oil pressure and the oil pressure detection result at a timing of a start of a change in a rotation speed ratio between the main shaft and the counter shaft based on detection results of the first detection unit and the second detection unit (for example, S2).

According to this embodiment, it is possible to relatively correctly determine the following property of the instructed oil pressure to the detected oil pressure at the start of engagement.

3. In the automatic transmission (for example, 1) according to the above embodiment, the engaging time is specified based on the change in the rotation speed ratio (for example, FIG. 5A, FIG. 5B).

According to this embodiment, it is possible to relatively correctly specify the engaging time.

4. In the automatic transmission (for example, 1) according to the above embodiment, the control valve is provided in correspondence with each of the plurality of hydraulic friction engaging mechanisms.

According to this embodiment, it is possible to relatively correctly perform learning for each engaging mechanism.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2017-072029, filed Mar. 31, 2017, which is hereby incorporated by reference herein in its entirety.

What is claimed is:

1. An automatic transmission comprising:
   a plurality of hydraulic friction engaging mechanisms configured to switch a transmission path of a driving force and establish a plurality of gears;
   at least one control valve configured to control oil pressures of hydraulic oils supplied to the plurality of hydraulic friction engaging mechanisms;
   an oil pressure detection unit configured to detect the oil pressure of the hydraulic oil supplied by the control valve;
   a learning unit configured to learn a correction value of an instructed oil pressure to the control valve such that an engaging time becomes a target engaging time; and
   a determination unit configured to determine, based on a difference between the instructed oil pressure to the control valve and an oil pressure detection result obtained by the oil pressure detection unit from the hydraulic oil supplied by the control valve in correspondence with the instructed oil pressure, whether to exclude a control result by the instructed oil pressure from a learning target of the learning unit.

2. The transmission according to claim 1, further comprising:
   a first detection unit configured to detect a rotation speed of a main shaft; and
   a second detection unit configured to detect a rotation speed of a counter shaft,
   wherein the determination unit performs the determination based on the instructed oil pressure and the oil pressure detection result at a timing of a start of a change in a rotation speed ratio between the main shaft and the counter shaft based on detection results of the first detection unit and the second detection unit.

3. The transmission according to claim 2, wherein the engaging time is specified based on the change in the rotation speed ratio.

4. The transmission according to claim 1, wherein the control valve is provided in correspondence with each of the plurality of hydraulic friction engaging mechanisms.

* * * * *